Dec. 10, 1946.   L. M. HENRICKS   2,412,399
FISHING FLOAT
Filed Dec. 1, 1944
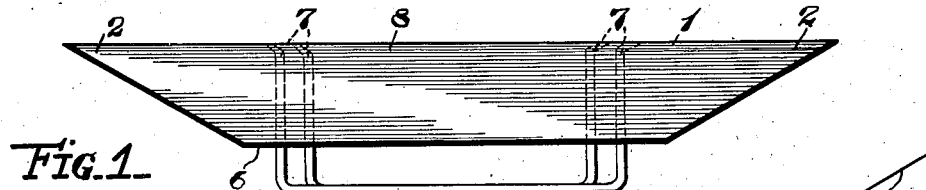
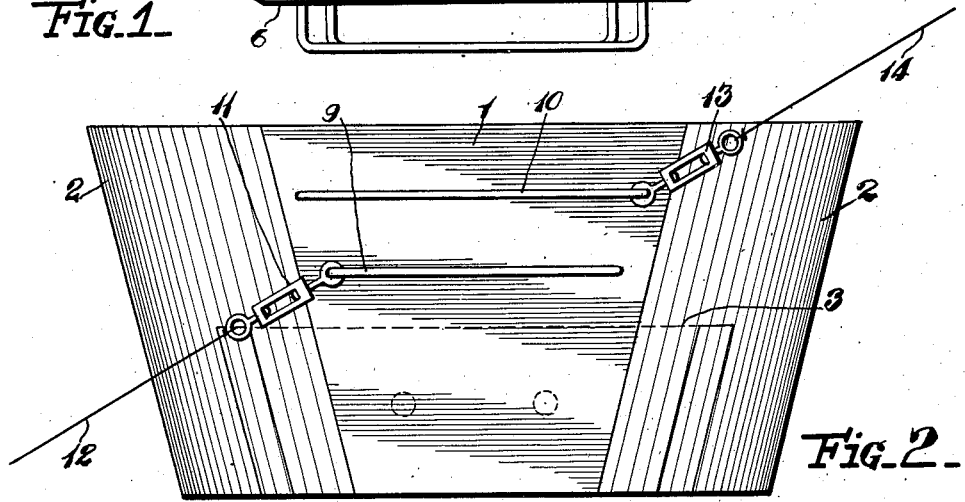
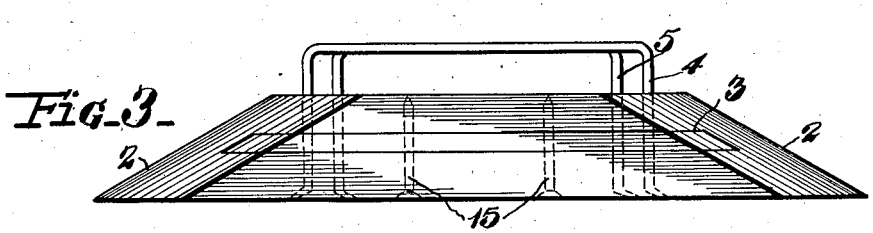
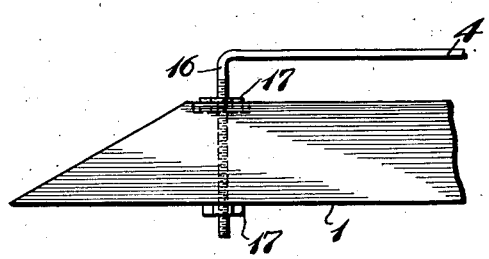
Inventor
Leo Miller Henricks
By McMorrow and Berman
Attorneys Patented Dec. 10, 1946

2,412,399

UNITED STATES PATENT OFFICE 2,412,399

FISHING FLOAT

Leo Miller Henricks, Indianapolis, Ind.

Application December 1, 1944, Serial No. 566,183

1 Claim. (Cl. 43—49)

This invention relates to floats for fishing lines, and more particularly to a float which may be guided in a specified manner so as to move back over a spot where a strike has been encountered without the need for recasting the line.

A main object of this invention is to provide a fishing float which can be controlled by the fisherman for accurate placement in a desired location by manipulation of the fishing line.

A further object of this invention is to provide a fishing float which can be controlled by manipulation of the fishing line so as to be placed in locations inaccessible by casting.

Further objects of this invention will appear from the following description and claim and from the accompanying drawing, wherein:

Figure 1 is a plan view showing the appearance of the top of the float of this invention.

Figure 2 is a view of the float of Figure 1 in front elevation.

Figure 3 is a plan view showing the appearance of the bottom of the float of Figure 1.

Figure 4 is a partial plan view similar to Figure 3, but disclosing a modification of a fishing float according to this invention.

Referring to the drawing, 1 designates the body portion of a fishing float in accordance with this invention. Body portion 1 is generally trapezoidal in plan as shown in Figures 1 and 3, to provide the tapered end edges 2. End edges 2 are downwardly tapered as shown in Figure 2, so that the float is also trapezoidal in elevation, but it may have any desired geometrical shape in elevation, such as rectangular, semi-circular, elliptical or any other shape. Body portion 1 is composed of light material such as wood.

A longitudinal groove 3 is provided in the bottom edge portion of the float body 1, and this groove is filled with lead to maintain the float upright in the water. Any other suitable weighting material may be employed at the bottom edge portion of body 1 if desired.

A pair of longitudinal guide members 4 and 5 are provided at one of the side faces 6 of body portion 1. These guide members in the embodiment of Figures 1 to 3, consist of U-shaped pieces of stiff wire, such as piano wire, driven into body member 1 and secured thereto by peening over or clenching the end portions 7 of the legs of the U at the opposite face 8 of body portion 1. The straight portions 9 and 10 of U-shaped members 4 and 5 extend longitudinally of body portion 1 for a substantial length and are parallel to face 6. When the float is in the water, guide portions 9 and 10 are maintained in a horizontal position.

Slidably mounted on guide portion 9 is a swivel member 11, one eye of which encircles guide portion 9 and the other eye of which is connected to the line 12 carrying the fishing hook. Slidably mounted on guide portion 10 is a swivel member 13, one eye of which encircles guide portion 10 and the other eye of which is connected to the line 14 which is connected to the fisherman's reel.

To place the hook in a desired location, line 14 is pulled first in one direction, then in the opposite direction, swivel members 13 and 11 alternately reversing their positions on body portion 1 as line 14 is reversed in direction. The pull on line 14 is transferred to body member 1 resulting in a component of motion transverse to the longitudinal axis of body member 1 as it moves through the water by virtue of the trapezoidal horizontal sectional shape of said body member. A zig-zag path of movement may be imparted to the float, controlled by the alternately directed pulls on line 14, whereby the float and hook may be moved in a controlled manner to a desired location, where a light strike has been previously experienced or which is inaccessible to direct casting.

As shown in Figure 3, nails 15 are driven through body member 1 to secure the mass of lead in groove 3.

The guide member 4 connected through swivel member 13 to line 14 may be made adjustable with respect to body member 1 by threading the leg portions 16 thereof, as shown in Figure 4, and providing nuts 17 threadedly engaging leg portions 16 at opposite faces of body member 1. In this embodiment, guide member 4 is preferably made of heavier stock so that the threads may be formed on the leg portions thereof. The adjustable feature is particularly useful in trolling, where it may be desired to employ a separate float on each of different lines, each float adjusted so as to be kept out of the boats wake and to keep the respective lines separated to avoid entanglement.

While specific embodiments of structures in accordance with this invention have been disclosed in the foregoing description, it will be understood that numerous modifications within the spirit of the invention will occur to those skilled in the art. Therefore, it is intended that no limitations be placed on the invention other than as defined by the scope of the appended claim.

What is claimed is:

A fishing float comprising a body member of buoyant material, said body member having a trapezoidal horizontal cross section and downwardly and forwardly converging opposite sides and unequal vertical trapezoidal parallel faces, a lower U-shaped member having legs partly penetrating the body member and a bight portion extending parallel to the smaller face of the body and horizontally, an upper U-shaped member above the lower U-shaped member and having legs partly penetrating the body and a horizontal bight portion disposed parallel to the smaller face of the body, a swivel member slidably engaging with one end the bight portion of the lower U-shaped member and engaging with the other end a fishing line, a second swivel slidably engaging with one end the bight portion of the upper U-shaped member and engaging with the other end a reel line.

LEO MILLER HENRICKS.